US012606242B2

(12) United States Patent
Tamaizumi et al.

(10) Patent No.: US 12,606,242 B2
(45) Date of Patent: Apr. 21, 2026

(54) CONTROL DEVICE FOR COMBINATION VEHICLE, CONTROL METHOD FOR COMBINATION VEHICLE, AND CONTROL PROGRAM FOR COMBINATION VEHICLE

(71) Applicants: JTEKT CORPORATION, Kariya (JP); J-QuAD DYNAMICS INC., Tokyo (JP)

(72) Inventors: Terutaka Tamaizumi, Okazaki (JP); Hirotaka Tokoro, Tokyo (JP)

(73) Assignees: JTEKT CORPORATION, Kariya (JP); J-QuAD DYNAMICS INC., Tokyo (JP)

( * ) Notice: Subject to any disclaimer, the term of this patent is extended or adjusted under 35 U.S.C. 154(b) by 26 days.

(21) Appl. No.: 18/864,209

(22) PCT Filed: May 2, 2023

(86) PCT No.: PCT/JP2023/017125

§ 371 (c)(1),
(2) Date: Nov. 8, 2024

(87) PCT Pub. No.: WO2023/223837

PCT Pub. Date: Nov. 23, 2023

(65) Prior Publication Data

US 2025/0296625 A1      Sep. 25, 2025

(30) Foreign Application Priority Data

May 20, 2022      (JP) ................................. 2022-082921

(51) Int. Cl.
B62D 13/06          (2006.01)
B60W 10/20          (2006.01)
(Continued)

(52) U.S. Cl.
CPC ............. B62D 13/06 (2013.01); B60W 10/20 (2013.01); B60W 30/18036 (2013.01);
(Continued)

(58) Field of Classification Search
CPC .. B62D 13/06; B62D 15/021; B62D 15/0285; B60W 10/20; B60W 30/18036;
(Continued)

(56) References Cited

U.S. PATENT DOCUMENTS 9,592,851 B2      3/2017  Lavoie et al.
2016/0031482 A1   2/2016  Lavoie
(Continued)

FOREIGN PATENT DOCUMENTS

DE      102016003234 A1      9/2016
JP      H02-144880 U        12/1990
(Continued)

OTHER PUBLICATIONS

Jul. 18, 2023 Search Report issued in International Patent Application No. PCT/JP2023/017125.
(Continued)

*Primary Examiner* — Long T Tran
*Assistant Examiner* — Charles J Brauch
(74) *Attorney, Agent, or Firm* — OLIFF PLC

(57) ABSTRACT

A control device is applied to a combination vehicle including a tractor and a trailer that is towed by the tractor. The control device is configured to perform a hitch angle variable acquisition process, a steered angle variable acquisition process, a virtual steering angle variable calculation process, a target virtual steering angle variable acquisition process, and a feedback process.

8 Claims, 4 Drawing Sheets

(51) Int. Cl.
*B60W 30/18* (2012.01)
*B62D 15/02* (2006.01)

(52) U.S. Cl.
CPC ....... *B62D 15/021* (2013.01); *B60W 2300/14* (2013.01); *B60W 2520/10* (2013.01); *B60W 2520/22* (2013.01); *B60W 2540/18* (2013.01); *B60W 2540/215* (2020.02); *B60W 2556/40* (2020.02)

(58) Field of Classification Search
CPC ......... B60W 2300/14; B60W 2520/10; B60W 2520/22; B60W 2540/18; B60W 2540/215; B60W 2556/40
See application file for complete search history.

(56) References Cited

U.S. PATENT DOCUMENTS

| | | | |
|---|---|---|---|
| 2017/0320520 A1 | 11/2017 | Greul et al. | |
| 2018/0134314 A1 | 5/2018 | Lavoie et al. | |
| 2019/0233005 A1* | 8/2019 | Maeda | B62D 6/008 |
| 2020/0001922 A1 | 1/2020 | Yamamoto et al. | |

FOREIGN PATENT DOCUMENTS

| | | |
|---|---|---|
| JP | 2002-326579 A | 11/2002 |
| JP | 2020-001631 A | 1/2020 |

OTHER PUBLICATIONS

Jul. 25, 2025 Extended European Search Report issued in European Patent Application No. 23807444.7.

* cited by examiner

CONTROL DEVICE FOR COMBINATION VEHICLE, CONTROL METHOD FOR COMBINATION VEHICLE, AND CONTROL PROGRAM FOR COMBINATION VEHICLE

CROSS-REFERENCE TO RELATED APPLICATIONS

This application is national stage application of International Application No. PCT/JP2023/017125, filed on May 2, 2023, which claims the benefit of priority from Japanese Patent Application No. 2022-082921, filed on May 20, 2022, the entire contents of each of which are incorporated herein by reference.

TECHNICAL FIELD

The present disclosure relates to control devices for combination vehicles, control methods for combination vehicles, and control programs for combination vehicles.

BACKGROUND ART

Conventionally, there is a combination vehicle that is composed of a vehicle serving as a tractor and a trailer connected thereto. Patent Document 1 proposes a control device that assists in reverse operations of a combination vehicle. When a driver controls the vehicle's reverse speed using an accelerator pedal and a brake pedal, this control device automatically steers the combination vehicle so that the trailer moves along a reference path specified by the driver.

RELATED ART DOCUMENTS

Patent Documents

Patent Document 1: U.S. Pat. No. 9,592,851

SUMMARY OF THE INVENTION

Problem to be Solved by the Invention

A combination vehicle is basically driven by manipulating the steered angle of a tractor. However, there is a significant nonlinearity between the direction of travel of a trailer and the steered angle of a tractor. Therefore, it is difficult to design a controller for controlling the direction of travel of a trailer.

Means for Solving the Problem

One aspect of the present disclosure is applied to a control device for a combination vehicle including a tractor and a trailer that is towed by the tractor. The control device is configured to perform a hitch angle variable acquisition process, a steered angle variable acquisition process, a virtual steering angle variable calculation process, a target virtual steering angle variable acquisition process, and a feedback process. The hitch angle variable acquisition process is a process of acquiring a value of a hitch angle variable. The hitch angle variable is a variable indicating a hitch angle that is an angle between a front-rear direction of the tractor and a front-rear direction of the trailer. The steered angle variable acquisition process is a process of acquiring a value of a steered angle variable. The steered angle variable is a variable indicating a steered angle of the tractor. The virtual steering angle variable calculation process is a process of calculating a value of a virtual steering angle variable using the value of the hitch angle variable and the value of the steered angle variable as inputs. The virtual steering angle variable is a variable indicating a direction of travel at a connection point between the tractor and the trailer. The target virtual steering angle variable acquisition process is a process of acquiring a value of a target virtual steering angle variable. The target virtual steering angle variable is a variable indicating a target value of the virtual steering angle variable. The feedback process includes a manipulated variable calculation process, a target steered angle variable calculation process, and a manipulation process. The manipulated variable calculation process is a process of calculating a manipulated variable for feedback control using the value of the virtual steering angle variable and the value of the target virtual steering angle variable as inputs. The target steered angle variable calculation process is a process of converting the manipulated variable to a value of a target steered angle variable according to the value of the hitch angle variable and the value of the steered angle variable. The target steered angle variable is a variable indicating a target value of the steered angle. The manipulation process is a process of manipulating the steered angle according to the value of the target steered angle variable.

Another aspect of the present disclosure is applied to a control method for a combination vehicle including a tractor and a trailer that is towed by the tractor. The control method includes performing a hitch angle variable acquisition process, a steered angle variable acquisition process, a virtual steering angle variable calculation process, a target virtual steering angle variable acquisition process, and a feedback process. The hitch angle variable acquisition process is a process of acquiring a value of a hitch angle variable. The hitch angle variable is a variable indicating a hitch angle that is an angle between a front-rear direction of the tractor and a front-rear direction of the trailer. The steered angle variable acquisition process is a process of acquiring a value of a steered angle variable. The steered angle variable is a variable indicating a steered angle of the tractor. The virtual steering angle variable calculation process is a process of calculating a value of a virtual steering angle variable using the value of the hitch angle variable and the value of the steered angle variable as inputs. The virtual steering angle variable is a variable indicating a direction of travel at a connection point between the tractor and the trailer. The target virtual steering angle variable acquisition process is a process of acquiring a value of a target virtual steering angle variable. The target virtual steering angle variable is a variable indicating a target value of the virtual steering angle variable. The feedback process includes a manipulated variable calculation process, a target steered angle variable calculation process, and a manipulation process. The manipulated variable calculation process is a process of calculating a manipulated variable for feedback control using the value of the virtual steering angle variable and the value of the target virtual steering angle variable as inputs. The target steered angle variable calculation process is a process of converting the manipulated variable to a value of a target steered angle variable according to the value of the hitch angle variable and the value of the steered angle variable. The target steered angle variable is a variable indicating a target value of the steered angle. The manipulation process is a process of manipulating the steered angle according to the value of the target steered angle variable.

Still another aspect of the present disclosure is applied to a control program for a combination vehicle including a tractor and a trailer that is towed by the tractor. The control program is configured to cause a computer to perform a hitch angle variable acquisition process, a steered angle variable acquisition process, a virtual steering angle variable calculation process, a target virtual steering angle variable acquisition process, and a feedback process. The hitch angle variable acquisition process is a process of acquiring a value of a hitch angle variable. The hitch angle variable is a variable indicating a hitch angle that is an angle between a front-rear direction of the tractor and a front-rear direction of the trailer. The steered angle variable acquisition process is a process of acquiring a value of a steered angle variable. The steered angle variable is a variable indicating a steered angle of the tractor. The virtual steering angle variable calculation process is a process of calculating a value of a virtual steering angle variable using the value of the hitch angle variable and the value of the steered angle variable as inputs. The virtual steering angle variable is a variable indicating a direction of travel at a connection point between the tractor and the trailer. The target virtual steering angle variable acquisition process is a process of acquiring a value of a target virtual steering angle variable. The target virtual steering angle variable is a variable indicating a target value of the virtual steering angle variable. The feedback process includes a manipulated variable calculation process, a target steered angle variable calculation process, and a manipulation process. The manipulated variable calculation process is a process of calculating a manipulated variable for feedback control using the value of the virtual steering angle variable and the value of the target virtual steering angle variable as inputs. The target steered angle variable calculation process is a process of converting the manipulated variable to a value of a target steered angle variable according to the value of the hitch angle variable and the value of the steered angle variable. The target steered angle variable is a variable indicating a target value of the steered angle. The manipulation process is a process of manipulating the steered angle according to the value of the target steered angle variable.

MODES FOR CARRYING OUT THE INVENTION

An embodiment of the present invention will be described with reference to the drawings.

"Configuration of Combination Vehicle"

Figure 1:
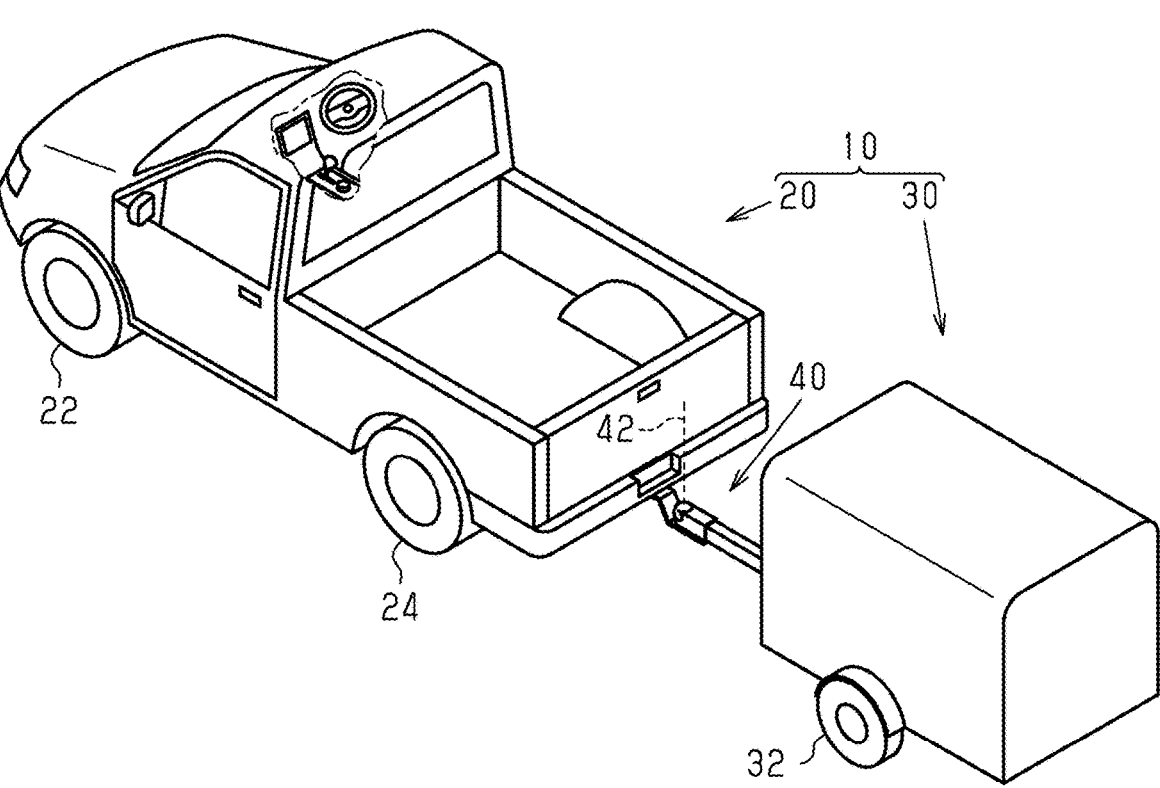
FIG. 1 is a perspective view showing the configuration of a combination vehicle according to an embodiment.

As shown in FIG. 1, a combination vehicle 10 includes a tractor 20 and a trailer 30. FIG. 1 illustrates, as the tractor 20, a pickup truck that is one type of small truck. The tractor 20 includes front wheels 22 and rear wheels 24. The front wheels 22 include two wheels, namely a right front wheel and a left front wheel, and the rear wheels 24 include two wheels, namely a right rear wheel and a left rear wheel. FIG. 1 illustrates an enclosed box trailer as the trailer 30. The trailer 30 includes wheels 32. The wheels 32 include two wheels, namely a right wheel and a left wheel.

The trailer 30 is connected to the rear of the tractor 20 via a ball joint 40. The ball joint 40 is a member that connects the trailer 30 to the tractor 20 so that the trailer 30 can rotate about an axis 42. The axis 42 extends in the height direction of the tractor 20.

Figure 2:
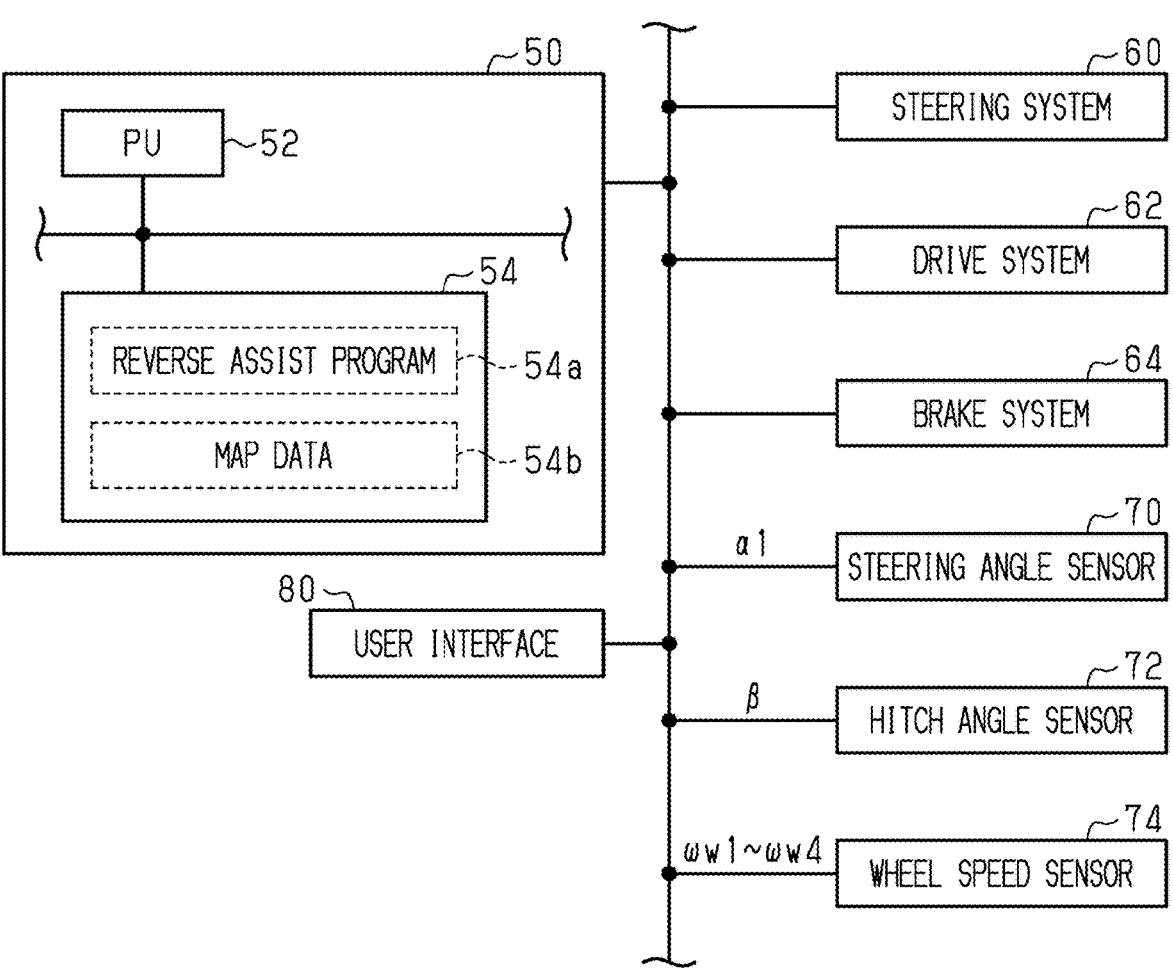
FIG. 2 is a block diagram showing the configuration of a control system according to the embodiment.

FIG. 2 shows some of members of the tractor 20. As shown in FIG. 2, the tractor 20 includes a control device 50. The control device 50 operates a steering system 60, a drive system 62, and a brake system 64 in order to control controlled variables of the combination vehicle 10 that is a controlled object. The controlled variables include a vehicle speed, a direction of travel, and a hitch angle. The hitch angle is an angle between the front-rear direction of the tractor 20 and the front-rear direction of the trailer 30.

The steering system 60 includes a steering actuator that steers steered wheels. The steered wheels are, for example, the front wheels 22 shown in FIG. 1. The steering system 60 may include a steering control device that operates the steering actuator. In that case, the "control device 50 operates the steering system 60" means that the control device 50 outputs command signals to the steering control device.

The drive system 62 includes at least one of the following two devices as a thrust generation device for the vehicle: an internal combustion engine and a rotating electrical machine. The drive system 62 may include a drive control device that controls the internal combustion engine and the rotating electrical machine. In that case, the "control device 50 operates the drive system 62" means that the control device 50 outputs command signals to the drive control device.

The brake system 64 includes at least one of the following two devices: a device that reduces the speed of rotation of the wheels using a frictional force, and a device that reduces the speed of rotation of the wheels by converting the power of the wheels to electrical energy. The device that reduces the speed of rotation of the wheels by converting the power of the wheels to electrical energy may be shared with the rotating electrical machine of the drive system. The brake system 64 may include a brake control device that controls the devices that reduce the speed of rotation of the wheels. In that case, the "control device 50 operates the brake system 64" means that the control device 50 outputs command signals to the brake control device.

The control device 50 refers to a steered angle $\alpha 1$ of the steered wheels detected by a steering angle sensor 70 in order to control the controlled variables. The steered angle $\alpha 1$ is a value that takes a positive sign for one of a right turn and a left turn and takes a negative sign for the other. The steered angle $\alpha 1$ is a turning angle of tires. For example, when the steering system 60 includes a rack and pinion mechanism, the steering angle sensor 70 may be a sensor that detects a pinion angle. In that case, however, the control device 50 performs a process of converting the pinion angle to the turning angle of the tires. Hereinafter, for convenience of description, the turning angle of the tires is regarded as a detection value of the steering angle sensor 70 even if the turning angle of the tires is obtained by the above conversion process.

The control device 50 also refers to a hitch angle $\beta$ detected by a hitch angle sensor 72. The hitch angle $\beta$ may take either a positive sign or a negative sign depending on the angle between the direction of travel of the tractor 20 from rear to front and the direction of travel of the trailer 30 from rear to front. For example, the hitch angle $\beta$ may take a positive sign when the direction of travel of the trailer 30 from rear to front deviates counterclockwise from the direction of travel of the tractor 20 from rear to front by less than 180°. The control device 50 also refers to wheel speeds $\omega$w1 to $\omega$w4 detected by wheel speed sensors 74. The wheel speeds $\omega$w1, $\omega$w2 are the rotational speed of the right front wheel 22 and the rotational speed of the left front wheel 22, respectively. The wheel speeds $\omega$w3, $\omega$w4 are the rotational speed of the right rear wheel 24 and the rotational speed of the left rear wheel 24, respectively.

The control device 50 sets control of the controlled variables according to the operating state of a user interface 80. The user interface 80 is used to transmit intentions of a user to the control device 50, such as an intention to select one of the following two operations: manually steering the combination vehicle 10, and automatically steering the combination vehicle 10.

The control device 50 includes a PU 52 and a storage device 54. The PU 52 is a software processing device including at least one of the following: a CPU, a GPU, a TPU, etc. The storage device 54 stores a reverse assist program 54a.

The reverse assist program 54a defines commands for performing a reverse assist process. The reverse assist process is a process that should be performed by the PU 52 in order to assist in reversing the combination vehicle 10. The reverse assist process is a process of automatically steering the tractor 20. In the reverse assist process, however, brake operations and accelerator operations are left to the driver. The reverse assist process includes a process of receiving a request to steer the trailer 30. In the reverse assist process, the steered angle of the tractor 20 is controlled so as to meet the request to steer the trailer 30.

The request to steer the trailer 30 is input by the driver via the user interface 80. The request to steer the trailer 30 is sent by specifying a virtual steering angle $\alpha$2 of the trailer 30. The virtual steering angle $\alpha$2 is a variable that indicates the direction of travel at the connection point between the tractor 20 and the trailer 30. In other words, the virtual steering angle $\alpha$2 refers to a steered angle of virtual front wheels when the trailer 30 is virtually separated from the tractor 20 and regarded as a single vehicle with virtual front wheels. For example, specifying the virtual steering angle $\alpha$2 may be implemented by providing the user interface 80 with a dial having a positive correlation with the virtual steering angle $\alpha$2. The rotation angle of the dial and the virtual steering angle $\alpha$2 need not necessarily have a proportional relationship. In the following description, the virtual steering angle $\alpha$2 specified by the driver is referred to as target virtual steering angle $\alpha$2\*.

"Reverse Assist Process"

Figure 3:
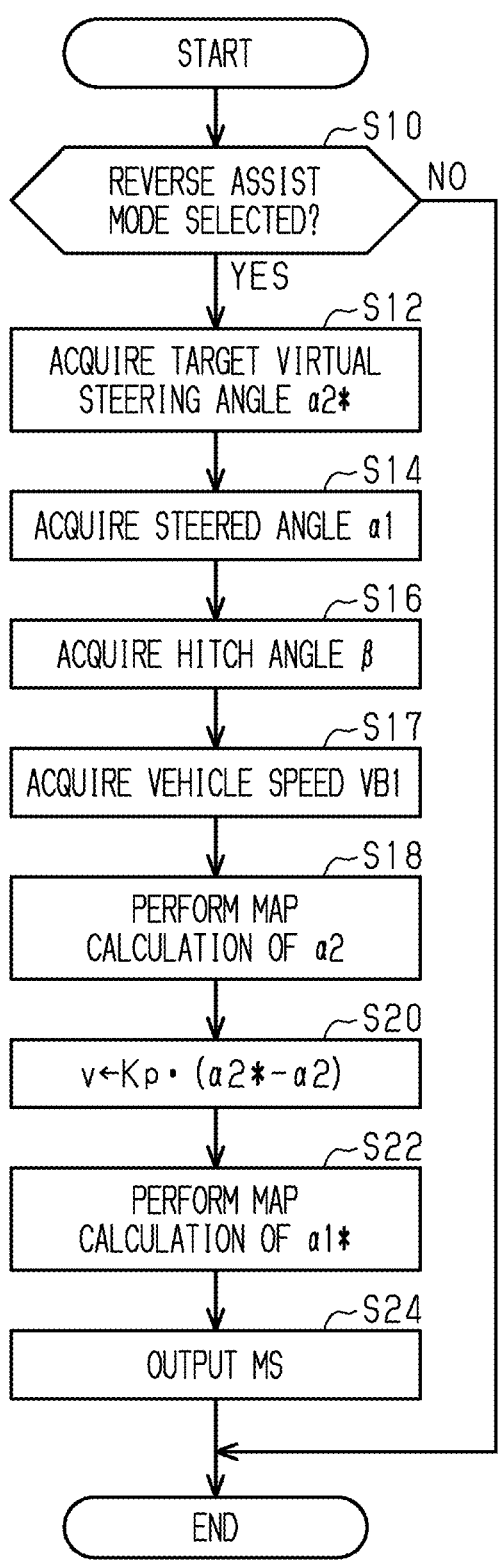
FIG. 3 is a flowchart showing the procedure of a process that is performed by a control device according to the embodiment.

FIG. 3 shows the procedure of a process related to the reverse assist process. The process shown in FIG. 3 is implemented by the PU 52 repeatedly executing the reverse assist program 54a in, for example, predetermined cycles. In the following description, the numbers preceded by the letter "S" represent step numbers of each process.

In the series of processes shown in FIG. 3, the PU 52 first determines whether a reverse assist mode is selected (S10). When it is determined that the reverse assist mode is selected (S10: YES), the PU 52 acquires a target virtual steering angle $\alpha$2\* input to the user interface 80 (S12). Next, the PU 52 acquires a steered angle $\alpha$1 detected by the steering angle sensor 70 (S14). The PU 52 also acquires a hitch angle $\beta$ detected by the hitch angle sensor 72 (S16). The PU 52 also acquires a vehicle speed VB1 (S17). The vehicle speed VB1 is calculated by the PU 52 based on the wheel speeds $\omega$w3, $\omega$w4. For example, the vehicle speed VB1 may be a simple average value of the wheel speeds $\omega$w3, $\omega$w4.

The PU 52 then performs a map calculation of a virtual steering angle $\alpha$2 using the vehicle speed VB1, the steered angle $\alpha$1, and the hitch angle $\beta$ as inputs (S18). In the present embodiment, as an example, the virtual steering angle $\alpha$2 is defined by the angle of the direction of travel of the ball joint 40 with respect to the front-rear direction of the trailer 30. The reason for calculating the virtual steering angle $\alpha$2 from the steered angle $\alpha$1 and the hitch angle $\beta$ will be described with reference to FIG. 4.

Figure 4:
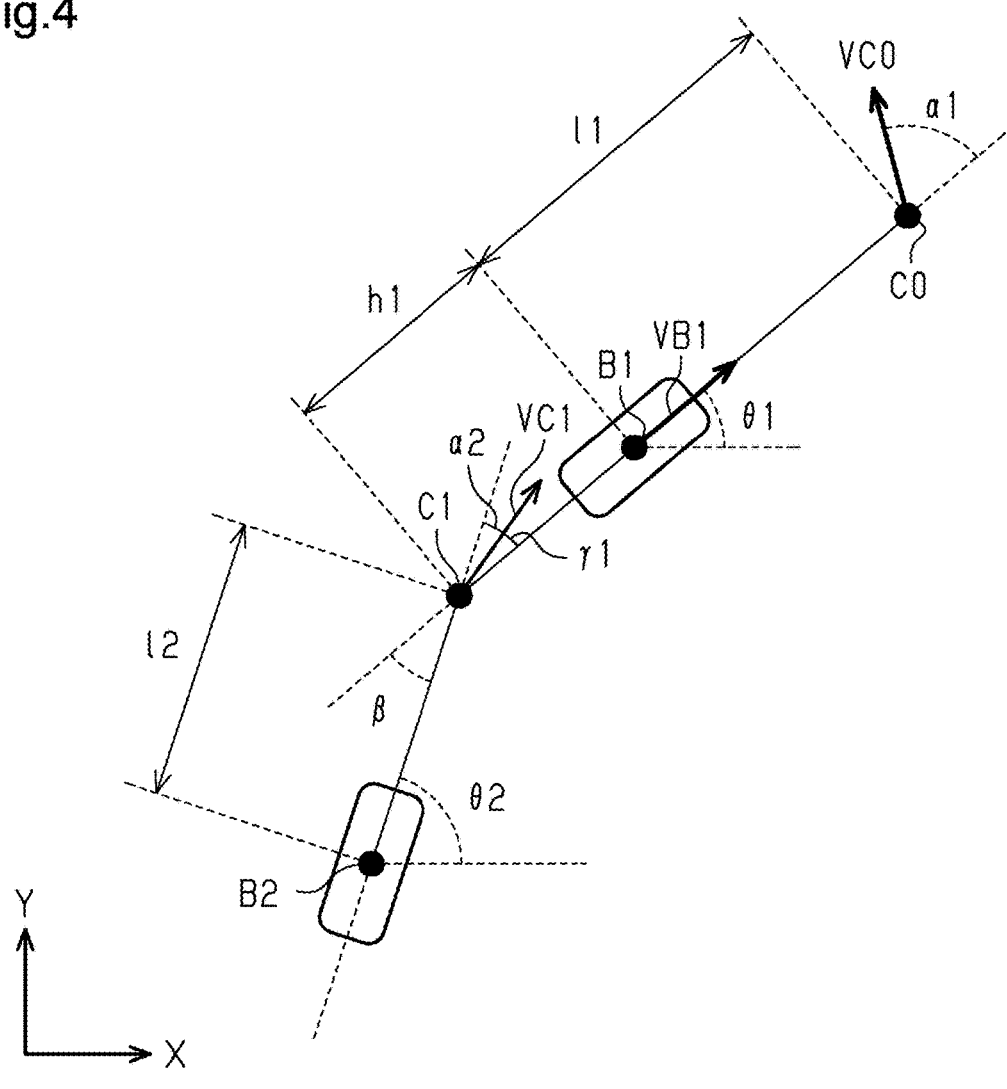
FIG. 4 is a diagram showing a model of the combination vehicle according to the embodiment.

FIG. 4 shows a model of the combination vehicle 10 that is used in the present embodiment. In the model shown in FIG. 4, the pair of front wheels 22 of the tractor 20 is regarded as a single front wheel C0, and the pair of rear wheels 24 of the tractor 20 is regarded as a single rear wheel B1. That is, a two-wheel model is used for the tractor 20. The pair of wheels 32 of the trailer 30 is regarded as a single wheel B2. The angle between a line determined by the front wheel C0 and a hitch point C1 and a line determined by the hitch point C1 and the wheel B2 is the hitch angle $\beta$. The hitch point C1 corresponds to a portion at the axis 42 in FIG. 1. A front wheel speed VC0, namely the speed of the front wheel C0, is expressed as a vector that moves in the direction of the steered angle $\alpha$1. The steered angle $\alpha$1 is quantified as an angle between the direction in which the front wheel C0 moves and the line determined by the front wheel C0 and the hitch point C1. The direction of the vehicle speed VB1 is parallel to the line determined by the front wheel C0 and the hitch point C1. The angle between the direction of the vehicle speed VB1 and the x direction in FIG. 4 is an angle $\theta$1. The angle between the line connecting the wheel B2 and the hitch point C1 and the x direction is an angle $\theta$2. A distance l1 between the front wheel C0 and the rear wheel B1, a distance h1 between the rear wheel B1 and the hitch point C1, and a distance l2 between the hitch point C1 and the wheel B2 are defined.

According to the above definitions, the direction of a speed VC1 of the hitch point C1 relative to the direction of travel from the wheel B2 to the hitch point C1 is the virtual steering angle $\alpha$2. The virtual steering angle $\alpha$2 is given by $-(\beta-\gamma$1$)$ using an angle $\gamma$1 of the direction of the speed VC1 of the hitch point C1 with respect to the direction of travel from the hitch point C1 to the front wheel C0.

In the model shown in FIG. 4, the following equations (c1) to (c3) are established using the coordinates (xc0, yc0) of the front wheel C0, the coordinates (xb1, yb1) of the rear wheel B1, and the coordinates (xc1, yc1) of the hitch point C1.

$$VC0 \cdot \cos\alpha 1 = VB1 \qquad (c1)$$

$$xc0 = xb1 + l1 \cdot \cos\theta 1 \qquad (c2)$$

$$xc1 = xb1 + h1 \cdot \cos\theta 1 \qquad (c3)$$

The following equation (c4) is obtained using both an expression obtained by differentiating both sides of the above equations (c2), (c3) and the equation (c1).

$$h1 \cdot \tan\alpha 1 + l1 \cdot \tan\gamma 1 = 0 \qquad (c4)$$

According to the above equation (c4), the angle $\gamma 1$ can be expressed by the steered angle $\alpha 1$. Therefore, the virtual steering angle $\alpha 2$ is given by the following equation (c5).

$$\alpha 2 = -\beta - \arctan\{(h1/l1) \cdot \tan(\alpha 1)\} \tag{c5}$$

That is, the virtual steering angle $\alpha 2$ can be obtained from the hitch angle $\beta$ and the steered angle $\alpha 1$. More specifically, in the process of S18, the PU 52 performs a map calculation of the virtual steering angle $\alpha 2$ using map data 54b shown in FIG. 2. The map data 54b is stored in the storage device 54. The map data 54b uses the hitch angle $\beta$ and the steered angle $\alpha 1$ as input variables and the virtual steering angle $\alpha 2$ as an output variable.

The map data is a data set of discrete values of the input variables and values of the output variable corresponding to the values of the input variables. The map calculation may be a process in which, when the values of the input variables match any of the values of the input variables in the map data, a corresponding value of the output variable in the map data is output as a calculation result. The map calculation may be a process in which, when the values of the input variables do not match any of the values of the input variables in the map data, a value obtained by interpolating a plurality of values of the output variable included in the map data is output as a calculation result. Alternatively, the map computation may be a process in which, when the values of the input variables do not match any of the values of the input variables in the map data, the value of the output variable in the map data that corresponds to the values of the input variables in the map data closest to the values of the input variables, out of the plurality of values of the input variables included in the map data, is output as a calculation result.

The process of S18 can be regarded as a process of converting the steered angle $\alpha 1$ to the virtual steering angle $\alpha 2$ based on the hitch angle $\beta$. The PU 52 then calculates a manipulated variable v for feedback control in which the virtual steering angle $\alpha 2$ is used as a controlled variable and the target virtual steering angle $\alpha 2^*$ is used as a target value of the controlled variable (S20). In the present embodiment, a proportional controller is shown as an example of a feedback controller. That is, the PU 52 substitutes, for the manipulated variable v, a value obtained by subtracting the virtual steering angle $\alpha 2$ from the target virtual steering angle $\alpha 2^*$ and multiplying the subtraction result by a proportional gain Kp.

The PU 52 then converts the manipulated variable v to a target steered angle $\alpha 1^*$ according to the vehicle speed VB1, the hitch angle $\beta$, and the steered angle $\alpha 1$ (S22). This conversion process will now be described in detail. In the above model, a first-order time derivative of the hitch angle $\beta$ is given by the following equation (c6).

$$d\beta/dt = (VB1/l2) \cdot \sin \beta + \{VB1/(l1 \cdot l2)\} \cdot \{l2 + h2 \cdot \cos \beta\} \cdot \tan \alpha 1 \tag{c6}$$

A first-order time derivative of the steered angle $\alpha 1$ is assumed to be "$(\alpha 1^* - \alpha 1) \cdot \tau$" using a time constant $\tau$.

The following equation (c7) is obtained by differentiating both sides of the above equation (c5).

[Math. 1]

$$\alpha 2 = -\beta - \frac{h1 \cdot (1 + \tan^2 \alpha 1)}{l1 \cdot \left\{1 + \left(\frac{h1}{l1} \cdot \tan \alpha 1\right)^2\right\}} \cdot \alpha 1 = \tag{c7}$$

$$-\beta - \frac{h1 \cdot (1 + \tan^2 \alpha 1)}{l1 \cdot \left\{1 + \left(\frac{h1}{l1} \cdot \tan \alpha 1\right)^2\right\}} \cdot \left(\frac{\alpha 1 * - \alpha 1}{\tau}\right)$$

The following equation (c8) can be obtained from the above equation when a time derivative of the virtual steering angle $\alpha 2$ is expressed by "v" and the target steered angle $\alpha 1^*$ is expressed by the hitch angle $\beta$, the steered angle $\alpha 1$, and "v."

[Math. 2]

$$\alpha 1 * = -\frac{\{\tau \cdot l1^2 + \tau \cdot h1^2 \cdot \tan^2 \alpha 1\} \cdot (v + \beta)}{h1 \cdot l1 \cdot \{1 + \tan^2 \alpha 1\}} + \alpha 1 = \tag{c8}$$

$$-\frac{\{r \cdot l1^2 + \tau \cdot h1^2 \cdot \tan^2 \alpha 1\} \cdot \left\{v - \frac{VB1}{l2} \cdot \sin \beta - \frac{VB1}{l1 \cdot l2} \cdot (l2 + h1 \cdot \cos \beta 1) \cdot \tan \alpha 1\right\}}{h1 \cdot l1 \cdot \{1 + \tan^2 \alpha 1\}}$$

The above equation (c8) shows that "v" can be converted to the target steered angle $\alpha 1^*$ using the vehicle speed VB1, the steered angle $\alpha 1$, and the hitch angle $\beta$.

In the process of S22, the manipulated variable v is converted to the target steered angle $\alpha 1^*$ according to the coordinate transformation given by (c8). More specifically, the PU 52 performs a map calculation of the target steered angle $\alpha 1^*$ using the map data 54b shown in FIG. 2. In the map data 54b, the manipulated variable v, the vehicle speed VB1, the hitch angle $\beta$, and the steered angle $\alpha 1$ are input variables, and the target steered angle $\alpha 1^*$ is an output variable.

The PU 52 then outputs a manipulation signal MS to the steering system 60 to control the steered angle of the steered wheels so that the steered angle $\alpha 1$ follows the target steered angle $\alpha 1^*$ (S24). When the process of S24 is completed, the PU 52 ends the series of processes shown in FIG. 3.

Functions and the effects of the present embodiment will be described. As described above, when "v" is a first-order time derivative of the virtual steering angle $\alpha 2$, a time integral of "v" is the virtual steering angle $\alpha 2$. That is, "v" and the virtual steering angle $\alpha 2$ have a simple linear relationship.

Figure 5:
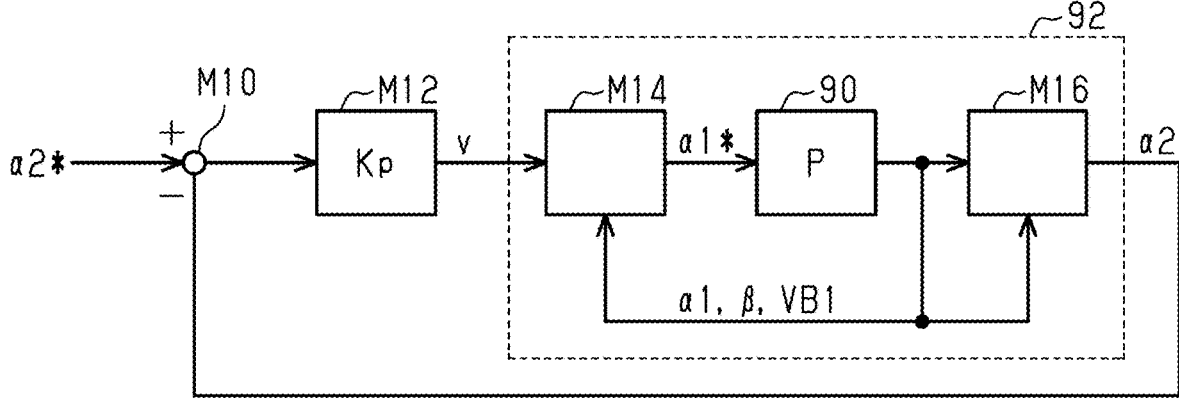
FIG. 5 is a block diagram illustrating effects of the embodiment.

Therefore, a virtual plant that receives "v" as an input and provides the virtual steering angle $\alpha 2$ as an output is created using the coordinate transformations given by the above equations (c5), (c8). FIG. 5 shows an actual plant 90 that is the combination vehicle 10 and a virtual plant 92 described above.

As can be seen from the above equation (c5), the actual plant 90 does not have a one-to-one correspondence between the steered angle $\alpha 1$ and the virtual steering angle $\alpha 2$. Therefore, in the case where the manipulated variable calculated using the difference between the target virtual steering angle $\alpha 2^*$ and the virtual steering angle $\alpha 2$ as an input is used as the target steered angle $\alpha 1^*$ in the process of step S20, it is difficult to design a controller for calculating the manipulated variable.

In the present embodiment, as shown in FIG. 5, the virtual plant 92 is configured to include a coordinate transformation M14 given by the above equation (c8) and a coordinate transformation M16 given by the above expression (c5). In this case, the manipulated variable v and the virtual steering angle $\alpha2$ have a simple linear relationship. It is therefore easy to design a controller M12 for calculating the manipulated variable v by using, as an input, the difference between the target virtual steering angle $\alpha2^*$ and the virtual steering angle $\alpha2$ calculated by an error calculation process M10. That is, in the present embodiment, designing the controller M12 is designing the proportional gain Kp that is a fixed value.

The above embodiment further has the following functions and effects. (1) The PU 52 converts the manipulated variable v to the target steered angle $\alpha1^*$ according to the vehicle speed VB1. In other words, the PU 52 converts the manipulated variable v to the target steered angle $\alpha1^*$ that is a value of a target steered angle variable, according to the vehicle speed of the tractor 20.

Characteristics of the actual plant depend on the vehicle speed. On the other hand, the PU 52 converts the manipulated variable to the target steered angle $\alpha1^*$ by taking the vehicle speed into consideration. The vehicle speed dependence of the virtual plant can thus be reduced. This allows the control accuracy of the feedback process to depend less on the vehicle speed.

(2) The PU 52 performs a map calculation of the target steered angle $\alpha1^*$ using the map data 54*b*. In the case where the process of converting the manipulated variable v to the target steered angle $\alpha1^*$ using the hitch angle $\beta$ and the steered angle $\alpha1$ is represented by an expression, this expression is complicated. Therefore, in the case where the process of S22 is a mathematical calculation process, requirements for the specifications of the control device 50 tend to be strict. In the present embodiment, on the other hand, the map data 54*b* is used. This can reduce requirements for the specifications of the control device.

(3) The PU 52 acquires the target virtual steering angle $\alpha2^*$ according to an input operation performed on the user interface 80 by the driver. Since the target virtual steering angle $\alpha2^*$ is determined by the driver, requirements for the control device 50 can be reduced compared to the case where the target virtual steering angle $\alpha2^*$ is determined by the control device 50.

OTHER EMBODIMENTS

The above embodiment can be modified as follows. The above embodiment and the following modifications can be combined unless technical contradictions arise.

"Virtual Steering Angle Variable Calculation Process"

In the above embodiment, the virtual steering angle $\alpha2$ is calculated using the steered angle $\alpha1$ and the hitch angle $\beta$ as inputs. However, the present disclosure is not limited to this. For example, instead of the steered angle $\alpha1$, the target steered angle $\alpha1^*$ may be used as a value of a steered angle variable. A value of a hitch angle variable is not limited to the most recent sampled value of the hitch angle $\beta$. For example, an estimated value of the hitch angle predicted from the steered angle $\alpha1$ and hitch angle $\beta$ acquired in the previous processes of S14, S16 may be used.

The virtual steering angle $\alpha2$ need not necessarily be obtained by a map calculation. For example, the virtual steering angle $\alpha2$ may be calculated using the above equation (c5).

"Target Steered Angle Variable Calculation Process"

In the above embodiment, the PU 52 calculates the target steered angle $\alpha1^*$ using the manipulated variable v, the vehicle speed VB1, the steered angle $\alpha1$, and the hitch angle $\beta$ as inputs. However, the present disclosure is not limited to this. For example, instead of the steered angle $\alpha1$, the PU 52 may use the target steered angle $\alpha1^*$ calculated in the previous process of S22 as a value of a steered angle variable. A value of a hitch angle variable is not limited to the most recent sampled value of the hitch angle $\beta$. For example, the PU 52 may use an estimated value of the hitch angle predicted from the steered angle $\alpha1$ and hitch angle $\beta$ acquired in the previous processes of S14, S16. For example, in the case where possible values of the vehicle speed VB1 are somewhat limited as in the reverse assist process, the vehicle speed VB1 may be a preset fixed value instead of a value detected by a sensor. That is, the vehicle speed VB1 need not necessarily be used as an input for a target steered angle variable calculation process.

The PU 52 need not necessarily obtain the target steered angle $\alpha1^*$ by a map calculation. For example, the PU 52 may calculate the target steered angle $\alpha1^*$ using the above equation (c8).

"Manipulated Variable Calculation Process"

The manipulated variable calculation process need not necessarily be a process that provides, as the manipulated variable v, an output value of a proportional element that receives the difference between the target virtual steering angle $\alpha2^*$ and the virtual steering angle $\alpha2$ as an input. The manipulated variable calculation process may be a process that provides, as the manipulated variable v, the sum of an output value of a proportional element that receives the above difference as an input and an output value of an integral element that receives the above difference as an input. Alternatively, for example, the manipulated variable calculation process may be a process that provides, as the manipulated variable v, the sum of an output value of a proportional element that receives the above difference as an input and an output value of a derivative element that receives the above difference as an input. Alternatively, for example, the manipulated variable calculation process may be a process that provides, as the manipulated variable v, the sum of an output value of a proportional element that receives the above difference as an input, an output value of an integral element that receives the above difference as an input, and an output value of a derivative element that receives the above difference as an input.

"Reverse Assist Process"

The reverse assist process need not necessarily be a process in which accelerator operations and brake operations are left to the driver. For example, the reverse assist process may be a process of automatically controlling the speed of the tractor 20.

"Feedback Process and Manipulation Process"

The feedback process need not necessarily be performed in the reverse assist process. For example, the control device 50 may perform the above feedback process and manipulation process in an automatic steering process in which the control device 50 sets the target virtual steering angle $\alpha2^*$. The automatic steering process need not necessarily be a process that is performed when reversing the combination vehicle 10. That is, the control device 50 may perform the above feedback process and manipulation process in the automatic steering process that is performed when moving the combination vehicle forward.

"Input Variables"

The input variables for each of the above processes are not limited to the hitch angle $\beta$, the steered angle $\alpha1$, etc. For example, instead of the steered angle $\alpha1$, the pinion angle itself described above may be used as an input variable.

11

"Control Device"

The control device is not limited to the one that includes the PU 52 and the storage device 54 and that performs software processing. For example, the control device may include a dedicated hardware circuit, such as an ASIC, that performs at least part of the various processes performed in the above embodiment. That is, the control device can be any control device as long as it has one of the following configurations (a) to (c): (a) a processing circuit including a processing device that performs all of the above processes according to a program, and a program storage device such as a storage device that stores the program, (b) a processing circuit including a processing device that performs part of the above processes according to a program, a program storage device, and a dedicated hardware circuit that performs the remainder of the above processes, and (c) a processing circuit including a dedicated hardware circuit that performs all of the above processes. There may be a plurality of software execution devices including a processing device and a program storage device, and a plurality of dedicated hardware circuits.

"Computer"

The computer that executes a control program such as the reverse assist program 54a is not limited to the computer installed in the combination vehicle 10. For example, the computer may be configured by both the PU 52 installed in the combination vehicle 10 and a mobile terminal of the driver. In that case, for example, the mobile terminal may perform the processes of S18 to S22.

"Vehicle"

The combination vehicle is not limited to the vehicle illustrated in FIG. 1.

The invention claimed is:

1. A control device for a combination vehicle including a tractor and a trailer that is towed by the tractor, the control device being configured to perform a hitch angle variable acquisition process, a steered angle variable acquisition process, a virtual steering angle variable calculation process, a target virtual steering angle variable acquisition process, and a feedback process, wherein:

the hitch angle variable acquisition process is a process of acquiring a value of a hitch angle variable;

the hitch angle variable is a variable indicating a hitch angle that is an angle between a front-rear direction of the tractor and a front-rear direction of the trailer;

the steered angle variable acquisition process is a process of acquiring a value of a steered angle variable;

the steered angle variable is a variable indicating a steered angle of the tractor;

the virtual steering angle variable calculation process is a process of calculating a value of a virtual steering angle variable using the value of the hitch angle variable and the value of the steered angle variable as inputs;

the virtual steering angle variable is a variable indicating a direction of travel at a connection point between the tractor and the trailer;

the target virtual steering angle variable acquisition process is a process of acquiring a value of a target virtual steering angle variable;

the target virtual steering angle variable is a variable indicating a target value of the virtual steering angle variable;

the feedback process includes a manipulated variable calculation process, a target steered angle variable calculation process, and a manipulation process;

the manipulated variable calculation process is a process of calculating a manipulated variable for feedback control using the value of the virtual steering angle variable and the value of the target virtual steering angle variable as inputs;

the target steered angle variable calculation process is a process of converting the manipulated variable to a value of a target steered angle variable according to the value of the hitch angle variable and the value of the steered angle variable;

the target steered angle variable is a variable indicating a target value of the steered angle; and the manipulation process is a process of manipulating the steered angle according to the value of the target steered angle variable.

2. The control device for the combination vehicle according to claim 1, wherein the target steered angle variable calculation process is a process of converting the manipulated variable to the value of the target steered angle variable according a vehicle speed of the tractor in addition to the value of the hitch angle variable and the value of the steered angle variable.

3. The control device for the combination vehicle according to claim 1, the control device comprising a storage device, wherein:

the storage device stores map data that defines a relationship of the value of the target steered angle variable with the manipulated variable, the value of the hitch angle variable, the value of the steered angle variable; and the target steered angle variable calculation process is a process of calculating the value of the target steered angle variable using the map data.

4. The control device for the combination vehicle according to claim 1, wherein:

the combination vehicle includes an interface for a driver to specify the value of the target virtual steering angle variable; and the target virtual steering angle variable acquisition process is a process of acquiring the value of the target virtual steering angle variable according to an input operation that is performed on the interface by the driver.

5. The control device for the combination vehicle according to claim 1, wherein the manipulated variable calculation process includes a proportional controller.

6. The control device for the combination vehicle according to claim 5, wherein a gain of the proportional controller is a fixed value.

7. A control method for a combination vehicle including a tractor and a trailer that is towed by the tractor, the control method comprising performing a hitch angle variable acquisition process, a steered angle variable acquisition process, a virtual steering angle variable calculation process, a target virtual steering angle variable acquisition process, and a feedback process, wherein:

the hitch angle variable acquisition process is a process of acquiring a value of a hitch angle variable;

the hitch angle variable is a variable indicating a hitch angle that is an angle between a front-rear direction of the tractor and a front-rear direction of the trailer;

the steered angle variable acquisition process is a process of acquiring a value of a steered angle variable;

the steered angle variable is a variable indicating a steered angle of the tractor;

the virtual steering angle variable calculation process is a process of calculating a value of a virtual steering angle variable using the value of the hitch angle variable and the value of the steered angle variable as inputs;

the virtual steering angle variable is a variable indicating a direction of travel at a connection point between the tractor and the trailer;

the target virtual steering angle variable acquisition process is a process of acquiring a value of a target virtual steering angle variable;

the target virtual steering angle variable is a variable indicating a target value of the virtual steering angle variable;

the feedback process includes a manipulated variable calculation process, a target steered angle variable calculation process, and a manipulation process;

the manipulated variable calculation process is a process of calculating a manipulated variable for feedback control using the value of the virtual steering angle variable and the value of the target virtual steering angle variable as inputs;

the target steered angle variable calculation process is a process of converting the manipulated variable to a value of a target steered angle variable according to the value of the hitch angle variable and the value of the steered angle variable;

the target steered angle variable is a variable indicating a target value of the steered angle; and the manipulation process is a process of manipulating the steered angle according to the value of the target steered angle variable.

8. A control program for a combination vehicle including a tractor and a trailer that is towed by the tractor, the control program being configured to cause a computer to perform a hitch angle variable acquisition process, a steered angle variable acquisition process, a virtual steering angle variable calculation process, a target virtual steering angle variable acquisition process, and a feedback process, wherein:

the hitch angle variable acquisition process is a process of acquiring a value of a hitch angle variable;

the hitch angle variable is a variable indicating a hitch angle that is an angle between a front-rear direction of the tractor and a front-rear direction of the trailer;

the steered angle variable acquisition process is a process of acquiring a value of a steered angle variable;

the steered angle variable is a variable indicating a steered angle of the tractor;

the virtual steering angle variable calculation process is a process of calculating a value of a virtual steering angle variable using the value of the hitch angle variable and the value of the steered angle variable as inputs;

the virtual steering angle variable is a variable indicating a direction of travel at a connection point between the tractor and the trailer;

the target virtual steering angle variable acquisition process is a process of acquiring a value of a target virtual steering angle variable;

the target virtual steering angle variable is a variable indicating a target value of the virtual steering angle variable;

the feedback process includes a manipulated variable calculation process, a target steered angle variable calculation process, and a manipulation process;

the manipulated variable calculation process is a process of calculating a manipulated variable for feedback control using the value of the virtual steering angle variable and the value of the target virtual steering angle variable as inputs;

the target steered angle variable calculation process is a process of converting the manipulated variable to a value of a target steered angle variable according to the value of the hitch angle variable and the value of the steered angle variable;

the target steered angle variable is a variable indicating a target value of the steered angle; and the manipulation process is a process of manipulating the steered angle according to the value of the target steered angle variable.

\* \* \* \* \*